Figure 14:
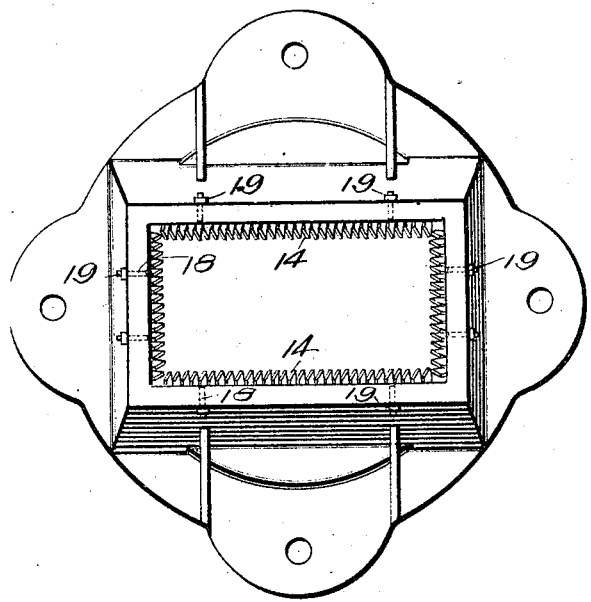

E. H. RODGERS.
PROCESS AND MACHINE FOR MAKING BRICKS.
APPLICATION FILED AUG. 2, 1915.
1,157,421.
Patented Oct. 19, 1915.
3 SHEETS—SHEET 1.
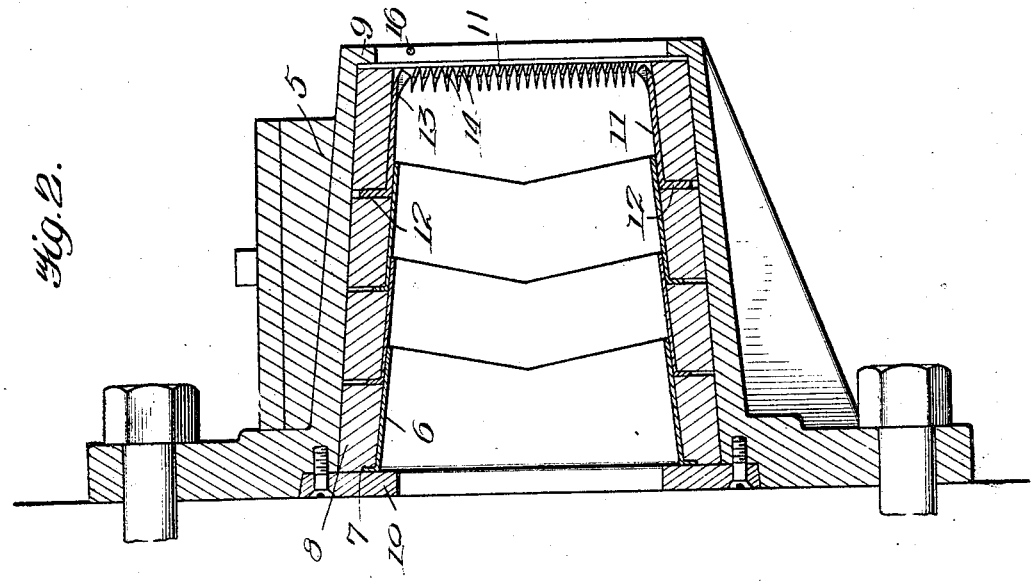
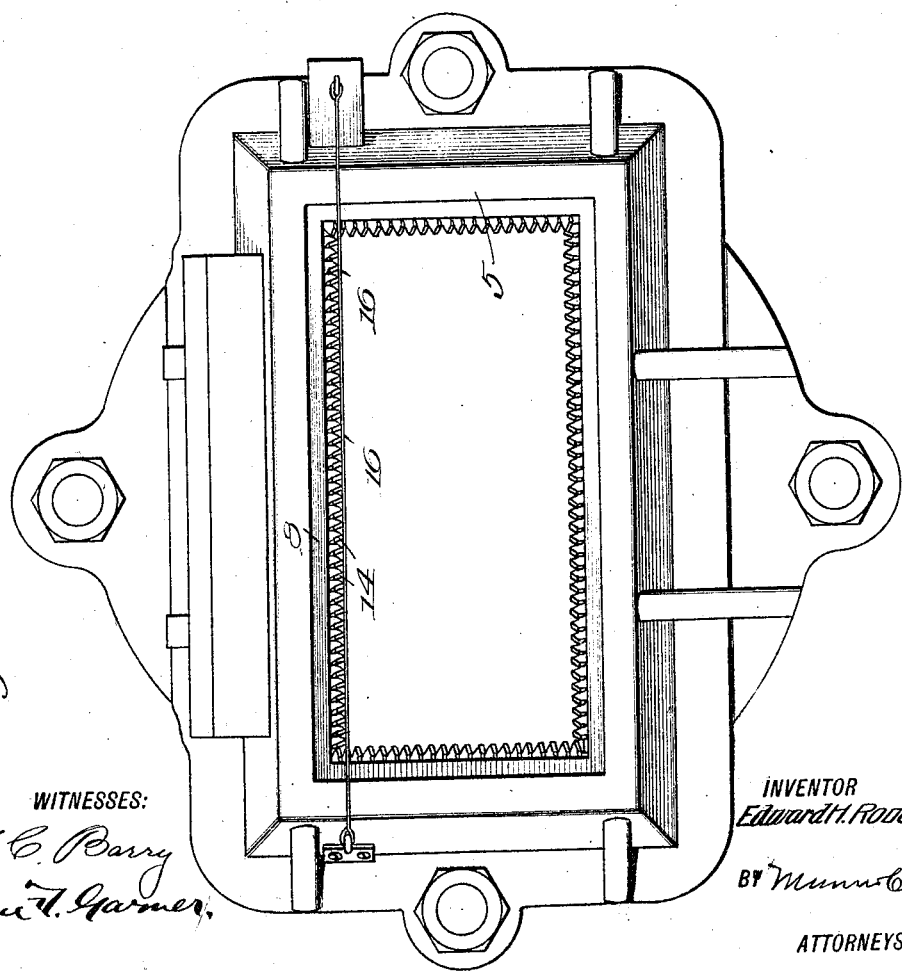
WITNESSES:
INVENTOR
Edward H. Rodgers,
BY
ATTORNEYS E. H. RODGERS.
PROCESS AND MACHINE FOR MAKING BRICKS.
APPLICATION FILED AUG. 2, 1915.
1,157,421.
Patented Oct. 19, 1915.
3 SHEETS—SHEET 2.
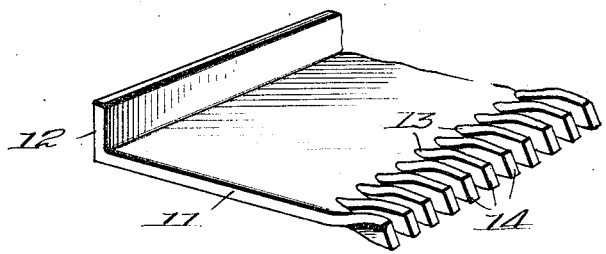
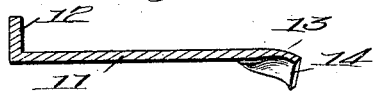
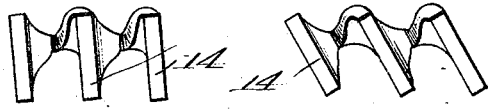  
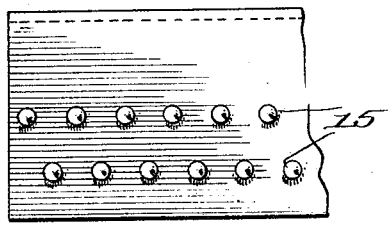 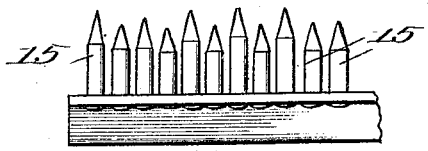
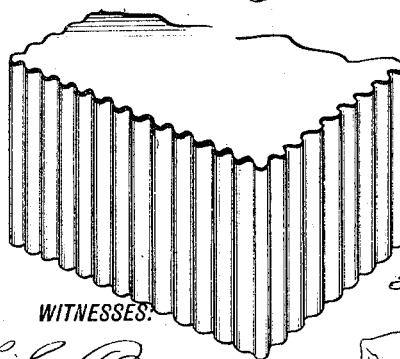 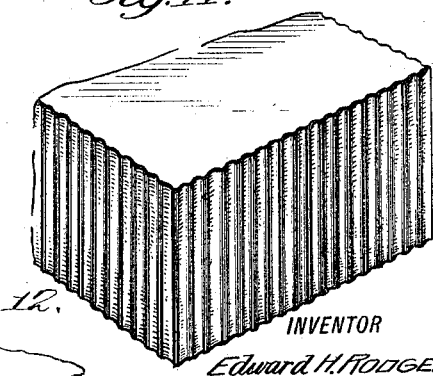
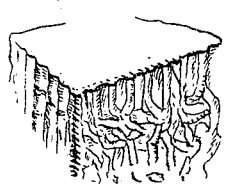
WITNESSES:
F. C. Barry
Alan T. Garner
INVENTOR
Edward H. Rodgers,
BY Munn & Co.
ATTORNEYS E. H. RODGERS.
PROCESS AND MACHINE FOR MAKING BRICKS.
APPLICATION FILED AUG. 2, 1915.

1,157,421.

Patented Oct. 19, 1915.
3 SHEETS—SHEET 3.

WITNESSES:
F. C. Barry
Alan T. Garner

INVENTOR
Edward H. Rodgers
BY Munn & Co.
ATTORNEYS

UNITED STATES PATENT OFFICE.

EDWARD H. RODGERS, OF EL PASO, TEXAS.

PROCESS AND MACHINE FOR MAKING BRICKS.

1,157,421.  Specification of Letters Patent.  Patented Oct. 19, 1915.

Application filed August 2, 1915. Serial No. 43,148.

*To all whom it may concern:*

Be it known that I, EDWARD H. RODGERS, a citizen of the United States, and a resident of El Paso, in the county of El Paso and State of Texas, have invented a certain new and useful Improvement in Processes and Machines for Making Bricks, of which the following is a specification.

This invention relates to an improvement in brick machines, and more particularly to an improved means whereby the clay ribbon may be corrugated or channeled and subsequently treated in producing bricks having a "textile" finish.

Another object of the invention is to provide a brick machine having a die equipped with a tubular liner plate through which the clay is expressed and which is provided with serrations or teeth along its delivery edge for lining the clay ribbon, the die being further provided with a cutting element in the nature of a wire adapted to separate the ridges or ribs formed by the liner from the body of the clay ribbon, in order that these ridges may be spread upon the surface of the ribbon in such manner as to adhere to the same.

In the operation of my device, in producing a brick with the desired "textile" finish, the clay ribbon as it emerges from the die is channeled or grooved on all four sides by means of the tubular liner plate, and the ridges or ribs thus formed are immediately thereafter cut or separated from one surface of the ribbon by a wire supported adjacent the liner plate. This results in the more or less even spreading or distribution of the separated particles or surface portions of the clay ribbon over the body of said ribbon, and in such a manner that when slight pressure is exerted on the face of the clay ribbon through the medium of a roller or other suitable means, the particles or segments are pressed into the body of the ribbon sufficiently to make them adhere firmly thereto, thus producing a texture or tapestry effect on the surface of the bricks.

Another object of the invention is to provide an improved device of the class described including a tubular liner plate or mold carried by the die and equipped with the channeling means so that the ridges or ribs are formed substantially simultaneously with the formation of the column of clay or clay ribbon, whereby a regular and uniform texture will be ultimately attained.

A still further object is to provide a mechanism of the class described which will be extremely simple, durable, efficient in operation, and inexpensive to manufacture.

With these and other objects in view which will become apparent as the description proceeds, the invention resides in the combination, arrangement, and construction of parts hereinafter more fully described and claimed, and illustrated in the accompanying drawings in which like characters of reference indicate like parts throughout the several figures, of which—

Figure 13:
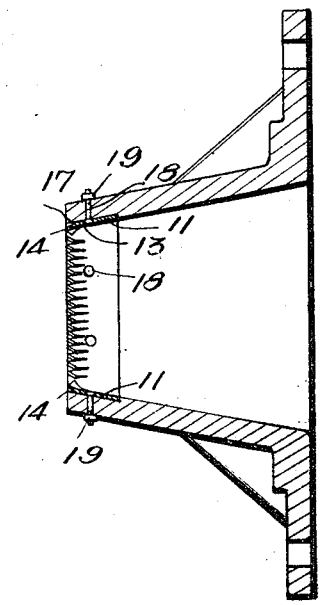
Figure 16:
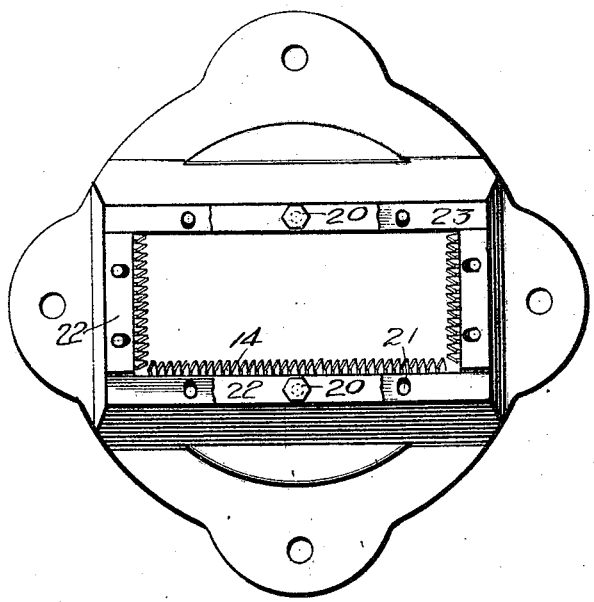
Figure 15:
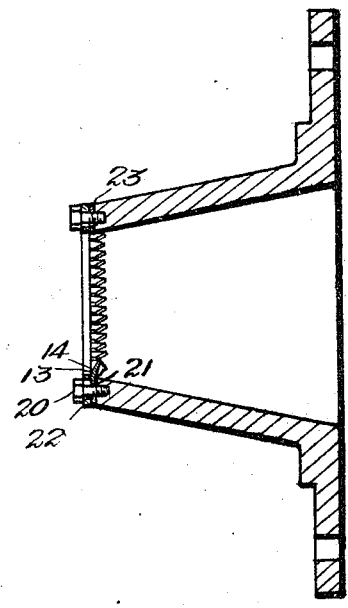

Figure 1 represents a view in and elevation of the die of a brick machine, equipped with my improved apparatus. Fig. 2 represents a vertical transverse sectional view taken therethrough. Fig. 3 represents a fragmentary view in perspective of a portion of the liner plate. Fig. 4 represents a vertical transverse sectional view taken through the liner plate. Figs. 5, 6, and 7 represent edge elevational views of the liner plate looking toward the teeth or plows provided thereon, and showing different arrangements of said teeth or plows. Fig. 8 represents a plan view of a fragment of modified form of liner plate. Fig. 9 represents an edge view thereof. Figs. 10 and 11 represent fragmentary views of different types of brick produced by the improved device. Fig. 12 represents a fragmentary view in perspective of a "tapestry" or "textile" brick produced in accordance with my invention. Fig. 13 represents a view in section taken through a dry die showing a method of attachment of the liner thereto. Fig. 14 represents a front elevational view of the same. Fig. 15 represents a view similar to Fig. 13, showing a different method of attachment of the liner to a dry die, and Fig. 16 represents a front elevational view of Fig. 15.

Referring more particularly to the drawings, a steam lubricated die is indicated at 5. Through this die the clay is adapted to be forced or expressed by the screw or auger of the brick machine (not shown), in forming the clay ribbon. The die is provided with a lining in the nature of a plurality of telescoping tubular plates 6. The rear edges of these tubular plates 6 are bent outwardly as at 7, and between the adjacent outwardly bent edges of the telescoping members are disposed rectangular frames 8 by means of which these tubular members are maintained in proper relation to each other. The frames 8 are maintained within the die between the inwardly extending flange 9 provided at the delivery end of said die, and a rectangular plate 10 secured against the die at the inner end thereof.

The lining terminates at its outer end or adjacent the delivery end of the die in the tubular substantially rectangular liner plate 11. The latter at its inner end, similarly to plates 6, is provided with an outwardly extending flange engaged between a pair of the frames 8 in the manner already set forth. This liner plate may be either in the form of a plurality of strips each forming one side of the plate, or may be made in a single piece as desired.

The outer or delivery edge of the liner plate or mold is slightly inturned as shown at 13 in Fig. 4. This delivery edge is provided or formed into a plurality of teeth or plows 14. The teeth preferably extend or project somewhat beyond the inner surface or face of the body of the liner plate or mold in order to contact with the clay ribbon as the latter is delivered.

The plows or teeth 14 are formed by transversely slitting the delivery edge of the liner plate at equally spaced intervals and by then twisting or turning the prongs or tongues thus defined into proper angular relation with each other and with the plane of the adjacent portion of the liner plate. The various arrangements illustrated in Figs. 5, 6, and 7 show how the teeth may be set at various angles and may be made of various lengths, in order that different designs and textures of brick may be obtained.

In Figs. 8 and 9 I have shown a modified form of liner plate. It consists in providing the plate near its outer edge with rows of metallic points as indicated at 15. The rows of points are set in staggered relation preferably and they extend inwardly in such manner as to engage against and suitably channel or mark the surfaces of the clay ribbon as the latter emerges from the die. The length and arrangement of the points or pins 15 may of course be varied in order to produce different textures or finishes in the brick.

As indicated in Figs. 1 and 2, the die is provided with a cutting element in the nature of a wire 16 which is stretched across the delivery opening of the die at the top part thereof. This wire is arranged substantially in alinement with the lower edges or inner edges carried by the upper portion of the liner plate. The exact position of the wire with reference to the liner plate may, however, be changed in order to attain various finishes and textures in the bricks.

As the clay is forced through the die, it is formed into a bar or ribbon of a height and width substantially equal to the breadth and length respectively of the bricks to be formed. As the column or ribbon of clay emerges from the die it comes in contact with the points or plows 14 simultaneously with its formation into the desired shape. Thus, as the ribbon leaves the die, it comes out in a perfect and regular shape thereby resulting in all of the bricks having a uniform scratch and texture. In forming the "textile" finished brick, the cutting element or wire 16 is utilized in severing or cutting the ribs or ridges formed on the upper surface of the clay ribbon from the body of the ribbon, thereby loosening the furrowed surface and disarranging the straight lines of the ribs or furrows and more or less evenly shifting and distributing them over the surface of the clay ribbon to produce an irregular textile effect. After the ribbon has been thus treated, suitable pressure is applied upon the upper surface of the column or clay ribbon through the medium of a roller or other device (not shown), in order to sufficiently press or mat the severed material against the body of the clay ribbon in order to make it adhere firmly thereto. The clay ribbon is subsequently cut into sections to form the bricks in any ordinary manner. A brick produced by this process is illustrated in Fig. 12.

The result of this process is that an attractive tapestry or textile appearance or finish is provided and of a more or less uniform character, so that when a finished wall made of bricks treated by this process is viewed, an even and ruglike effect will be noticed.

By dispensing with the use of the cutting element or wire 16, and by not rolling or pressing the surface of the clay ribbon, various effects such as those indicated in Figs. 10 and 11 may be produced. When the wire is not used, the surfaces of the brick will be corrugated or channeled as shown, and to a greater or less extent, depending upon whether the teeth or plows are set to cut deeply into the surfaces of the ribbon or to make shallow cuts therein. The effect as indicated in Fig. 10, is obtained by setting the teeth of the liner to make a comparatively deep corrugation or cut in the surface of the clay ribbon, while the effect indicated in Fig. 11 is produced by setting the teeth to make shallow grooves or furrows therein.

By having the liner plate provided on all four sides with the teeth or plows, it is possible to make brick with the rough textural effect on all four faces. Ordinarily the two ends and one side are all that are required to be finished, but it may at times be desirable to have the fourth face rough textured or finished. Great varieties of designs and finish may be obtained by setting the plows or teeth of the liner plate at different angles and depths.

Two methods of applying the liner plate to a dry die are indicated in Figs. 13—14 and 15—16 respectively.

Referring to Fig. 13 it will be seen that the liner plate 11 is arranged on the inside of the die near the outer end of the latter and is disposed in a rabbet 17 cut in the inner walls of the die. The outer inturned delivery edge 13 of the liner having the teeth or plows 14 provided thereon occurs substantially flush with the outer end of the die. The liner plate may be formed of a single tubular member, or if desirable and convenient, may be formed of a plurality of separate members, each one of which is arranged against one of the inner walls of the die. Furthermore, one or more sides of the liner if desired may be devoid of the teeth or plows. Means for connecting the liner with the die may take the form of bolts 18 having their heads counter-sunk in the liner and extending through openings provided in the walls of the die whereby to receive nuts 19 at their outer ends for detachably securing the liner plate in place.

The arrangement shown in Figs. 15 and 16 contemplates the positioning of the liner, which in this instance is preferably formed of separate pieces, each of which forms a side of the liner, on the outer end of the die with the plows or teeth 14 projecting laterally within the opening defined between the walls of the die. The liner is retained in position through the medium of screws or bolts 20 extending through openings 21 elongated transversely of the segments or sections composing the liner, and turning into threaded sockets in the end of the die. Overlying each of the segments is a retaining plate 22 through openings in which bolts 20 also extend. In this embodiment variations in the depth of the channels or grooves cut in the clay ribbon are attained by adjusting the segments forming the liner inwardly or outwardly with respect to the opening through the die. The segments are retained in position by tightening the bolts or screws 20 after the proper adjustment of the segments has been attained.

In the illustration of this method of attaching the liner, one of the segments forming a side of the liner comprises a spacer plate 23, of a thickness equal to the thickness of the remaining segments of the liner, and which is provided with the elongated openings through which bolts 20 extend. This plate has a plain inner edge so that but three sides of the ribbon will be channeled as it emerges from the brick machine.

The cutting wire may be, used in connection with the liner in either or both of the methods of attachment to a dry die shown in the drawings.

It will be understood that in practice, minor variations in the form or method of attachment may be made in order that the liner may be fitted to any make of die.

Although I have described the preferred embodiment of my invention I may desire to make such changes in the construction, combination and arrangement of parts thereof as do not depart from the spirit of the invention and the scope of the appended claims.

I claim:—

1. A brick machine including a die having a tubular liner plate having a delivery edge disposed adjacent the delivery end of the die, said delivery edge being inturned and provided with a plurality of teeth extending in angular relation with the adjacent surface of the liner plate, the opposite edge of the liner plate being provided with an outwardly turned flange adapted to be engaged by means for maintaining the liner plate within the die.

2. A brick machine including a die having a liner plate disposed therein, said liner plate being provided with an inturned delivery edge disposed adjacent the delivery end of the die, said delivery edge being transversely slitted to form tongues, said tongues being twisted into angular relation with the plane of the adjacent portion of the liner plate in order to provide teeth, substantially as described.

3. A brick machine including a die having a tubular liner plate having a delivery edge disposed adjacent the delivery end of the die and provided with teeth projecting beyond the inner surface of the body of said liner plate, substantially as set forth.

4. A brick machine including a die having a liner plate provided with a delivery edge having teeth projecting beyond the inner surface of the body of said liner plate.

5. A brick machine including a die having a tubular liner plate whose delivery edge is inturned and toothed, substantially as described.

6. A brick machine including a liner plate whose delivery edge is inturned and formed into teeth, substantially as set forth.

7. A liner plate for brick machines, substantially as described, having its delivery edge provided with teeth as and for the purpose set forth.

8. In a brick machine, the combination of a die having a liner plate provided with a delivery edge having teeth projecting beyond the inner surface of the body of the liner plate, and a cutting element carried by the die beyond the liner plate and substantially in alinement with the inner edges of the teeth arranged on one side of said liner plate.

9. In a brick machine, the combination of a die having a liner plate provided with a delivery edge adjacent the delivery end of the die and having inwardly projecting teeth formed on said delivery edge, and a wire fixedly disposed with relation to the liner plate and arranged substantially in alinement with the inner edges of the teeth occurring along one side of said liner plate.

10. In a device of the class described, the combination of a liner plate having an inturned delivery edge provided with a plurality of teeth, and a wire arranged relatively to said liner plate and along one edge thereof, as and for the purpose set forth.

11. In a device of the class described, the combination of a liner plate adapted to form a clay ribbon, and to channel the faces of said ribbon, of a cutting element adapted to separate the ridges formed between the channels from the body portion of the ribbon, substantially as set forth.

12. The combination of a liner plate having an inturned edge provided with teeth adapted to form ridges in a column of clay, and a cutting element adapted to separate the ridges from the column, substantially as set forth.

13. A device of the class described, including a die having a liner plate disposed adjacent its delivery end, said liner plate being provided with a plurality of teeth.

14. A brick substantially as described having corrugations provided on a face and having the surfaces between the corrugations severed from the body of the brick and distributed thereover, substantially as described.

15. The herein described process of making brick which consists in forcing the same through a liner plate, grooving the brick as it is delivered from the liner plate, cutting the material between the grooves from the brick immediately following the grooving operation before described, and subsequently pressing the cut away surfaces against the brick, as and for the purpose set forth.

16. The herein described process of making brick which consists in forcing the same through a liner plate, grooving the brick as it is delivered from the liner plate, separating the surfaces between the grooves from the body of the brick and at the same time spreading said surfaces over said body and subsequently pressing the surfaces into engagement with the body.

EDWARD H. RODGERS.

Witnesses:
 Wm. S. Alkire,
 A. V. Smith.

Copies of this patent may be obtained for five cents each, by addressing the "Commissioner of Patents, Washington, D. C."